United States Patent [19]

Orth, Jr. et al.

[11] 4,017,642
[45] Apr. 12, 1977

[54] PROCESS OF MAKING FOOD FOR RUMINANT ANIMALS FROM WOOD AND/OR WOODY PRODUCTS

[75] Inventors: George O. Orth, Jr.; Richard D. Orth, both of Seattle, Wash.

[73] Assignee: George O. Orth, Seattle, Wash.

[22] Filed: July 28, 1975

[21] Appl. No.: 599,634

[52] U.S. Cl. .................................. 426/69; 426/635; 426/636; 426/71; 426/429; 426/481; 426/807; 536/1; 536/56

[51] Int. Cl.² ......................................... A23K 1/12

[58] Field of Search ................. 426/53, 69, 72, 74, 426/635, 429, 481, 807, 636; 127/37; 162/77, 78; 260/17.5, 21; 536/1, 36

[56] References Cited

UNITED STATES PATENTS

| | | | |
|---|---|---|---|
| 2,003,347 | 6/1935 | Dreyfuss | 162/77 |
| 2,772,968 | 12/1956 | Grondal et al. | 162/77 |
| 3,069,269 | 12/1962 | Rubin | 426/2 |
| 3,212,933 | 10/1965 | Hess et al. | 426/635 |
| 3,502,478 | 3/1970 | Erwin | 426/69 |
| 3,796,809 | 3/1974 | Miller et al. | 426/2 |
| 3,887,426 | 6/1975 | Fogarassy | 162/77 |

*Primary Examiner*—Raymond N. Jones
*Assistant Examiner*—R. A. Yoncoskie
*Attorney, Agent, or Firm*—Seed, Berry, Vernon & Baynham

[57] ABSTRACT

Wood and/or woody wastes, particularly coniferous woods, are treated to render them suitable as a high energy food for ruminating animals. Comminuted wood or woody wastes are impregnated with a glycol or glycol-ether solvent and a catalyst, and the mixture heated to a temperature of at least 145° C. for a time sufficient to delignify the wood the desired amount and solubilize extraneous components in the wood which are detrimental to the digestibility of the treated wood by the ruminant. The treated wood is then defibrated and the glycol solvent and catalyst extracted from the treated wood and recovered for recycle and reuse. The pulp recovered from extraction is a substantially anhydrous pulp which can be injected with nutrients promoting greater digestibility of the pulp and rehydrated for feeding to the ruminant.

16 Claims, 2 Drawing Figures

PROCESS OF MAKING FOOD FOR RUMINANT ANIMALS FROM WOOD AND/OR WOODY PRODUCTS

BACKGROUND OF THE INVENTION

1. Field of the Invention

This invention relates to a process of treating wood and/or woody products to render them suitable as a high energy food for ruminant animals and to a food product for ruminant animals.

2. Prior Art Relating to the Disclosure

The use of wood and wood products for feeding ruminant animals is not new. Ruminants include cud-chewing animals, such as cattle, sheep and goats. These animals have multicompartmented stomachs known, in order, as the rumen, reticulum, omasum and abomasum. The rumeno-reticulum is the largest part of the ruminant stomach. This organ maintains a large bacterial and protozoal population under near anaerobic conditions and functions as a fermentation vat to produce short-chain organic acids and other materials from the incoming food eaten by the animal. The short-chain organic acids are neutralized by alkaline saliva secreted by the animal. The main features of the rumen phase of digestion include: (1) fermentation of sugars, starches and cellulose to volatile fatty acids, such as acetic acid, propionic acid and butyric acid, which are absorbed and used by the animal; (2) synthesis of microbial protein from protein and non-protein in the diet of the animal; and (3) synthesis of the B-vitamins and vitamin K.

Wood and/or woody products which may be used serve two distinct functions in ruminant animals: (1) a source of roughage with little or no nutrient value, and (2) an energy source. To release the food value in wood and/or woody products requires treatment of the wood. Prerequisites for use of wood as food for ruminant animals include: (1) the economics of feeding treated wood and/or woody products compared to the cost of feeding conventional feed materials; and (2) treating of the wood (a) so that more carbohydrate nutrients are made available to the rumen micropopulation without causing excessive loss of micronutrients, (b) to effect removal of natural inhibitors in the wood that may interfere with normal rumen functions as, for examle, alkaloids and/or phenols, and (c) to not leave any residues or substances on the treated wood that are toxic to the micropopulation of the rumen or the animal in general.

It is known that the digestibility of wood and/or woody products is commensurate with the amount of lignin removed. This is particularly true with coniferous woods, such as Douglas fir, pines, hemlock and spruce. Alkaloids and other extraneous components of wood can affect the micropopulation of the rumen. A pulp food product comparatively free of extraneous components and retaining only a small portion of lignin is desired.

Pulp produced by the conventional Kraft process is not being used for feeding ruminants because of the high lignin content of the pulp. Wood pulp produced by the sulfite process, if sufficiently delignified, can be used for feeding ruminants. With either the Kraft or the sulfite process, however, it is not economical at the present time to use the pulp produced as a feed for ruminant animals compared to the cost of other available feeds on a return energy basis.

Delignification of wood using organic solvents is known. U.S. Pat. No. 2,772,968 discloses pulping of wood using triethylene glycol by heating the wood and triethylene glycol together at up to a temperature of about 125° C. The chips are then washed with triethylene glycol and the triethylene glycol recovered for reuse.

U.S. Pat. No. 3,585,104 describes a pulping process using ethanol as a solvent in high pressure pulping of wood with an alkaline catalyst.

Although there has been a great deal of research work carried out on pulping with organic solvents, it has generally been oriented to making of paper pulp. Co-pending application Ser. No. 488,747, filed July 15, 1974, and entitled "Method of Providing Digestible Food for Ruminating Animals," describes a process of making a food product for ruminant animals using a triethylene glycol solvent.

Processes are known for the production of hydrolysis products from lignocellulosic material in the form of sugars for supplemental feeding of ruminants. Processes of this type are disclosed in the following U.S. Pat. Nos. 745,645; 981,634; 1,032,440; 1,190,953; 1,855,464; 2,222,885; 2,944,921; 3,212,932; 3,212,933; 3,266,933; 3,251,716 and 3,314,797.

SUMMARY OF THE INVENTION

This invention is in a process for making a substantially anhydrous pulp which can be hydrated and fortified as a food for ruminant animals from wood and/or woody products using glycols and/or glycol-ethers containing from 2 to 6 carbon atoms, preferably ethylene glycol, diethylene glycol, or triethylene glycol. Comminuted wood and/or woody products are impregnated thoroughly with the glycol or glycol-ether solvent and a catalyst, and the mixture heated to a temperature of at least 145° C, for a time sufficient to achieve an adequate degree of delignification for the pulp to be used as food for ruminant animals. After cooking, the wood is subjected to defibration. The glycol solvent used to delignify the wood is recovered by washing and extracting the pulp by counter-current extraction techniques with a water soluble lower aliphatic alcohol. The pulp is recovered after extraction and may be used after hydration, as a food for ruminant animals. The solvent mixture from the extraction containing lignin, extraneous wood components wood sugars is distilled to recover the glycol solvent. Lignin is precipitated from the concentrated distillation residue and the residue vacuum distilled to recover any remaining glycol solvent and catalyst for recycle. Wood sugars recovered may be combined with the pulp for feeding to the ruminant animal after separation of undesirables, or used as a wood molasses for other purposes such as fermentation.

The primary object of this invention is an economical process of making food for ruminant animals for wood and/or woody products using a glycol solvent wherein the glycol and catalyst are recovered by distillation for reuse.

A further object of this invention is in a process of making a food for ruminant animals from wood and/or woody products, particularly coniferous woods, using triethylene glycol as a pulping solvent, wherein substantially all of the triethylene glycol remaining in the wood and/or woody products after impregnation, cooking and defibration is extracted therefrom by countercurrent extraction with an ethanol-water extraction solution and the triethylene glycol recovered for reuse.

A further object of this invention is in an overall process of making a substantially anhydrous food which can be rehydrated for ruminant animals from coniferous woods wherein the wood chips are impregnated with a triethylene glycol solution containing 1 to 5 percent by weight of an acid catalyst, based on the weight of triethylene glycol. The triethylene glycol-wood mixture is heated under an inert atmosphere to a temperature of at least 145° C for at least 3 to 5 hours. The chips are then defibrated and any remaining triethylene glycol solvent and catalyst extracted therefrom and recovered for recycle and reuse.

A further object of this invention is the production of a substantially anhydrous pulp which can be injected with nutrients such as ammonia, urea, vitamins, mineral salts, etc. for the ruminant animal at the discretion of the feed manufacturer and rehydrated for feeding to the ruminant animal.

DESCRIPTION OF THE PREFERRED EMBODIMENTS

Figure 1:
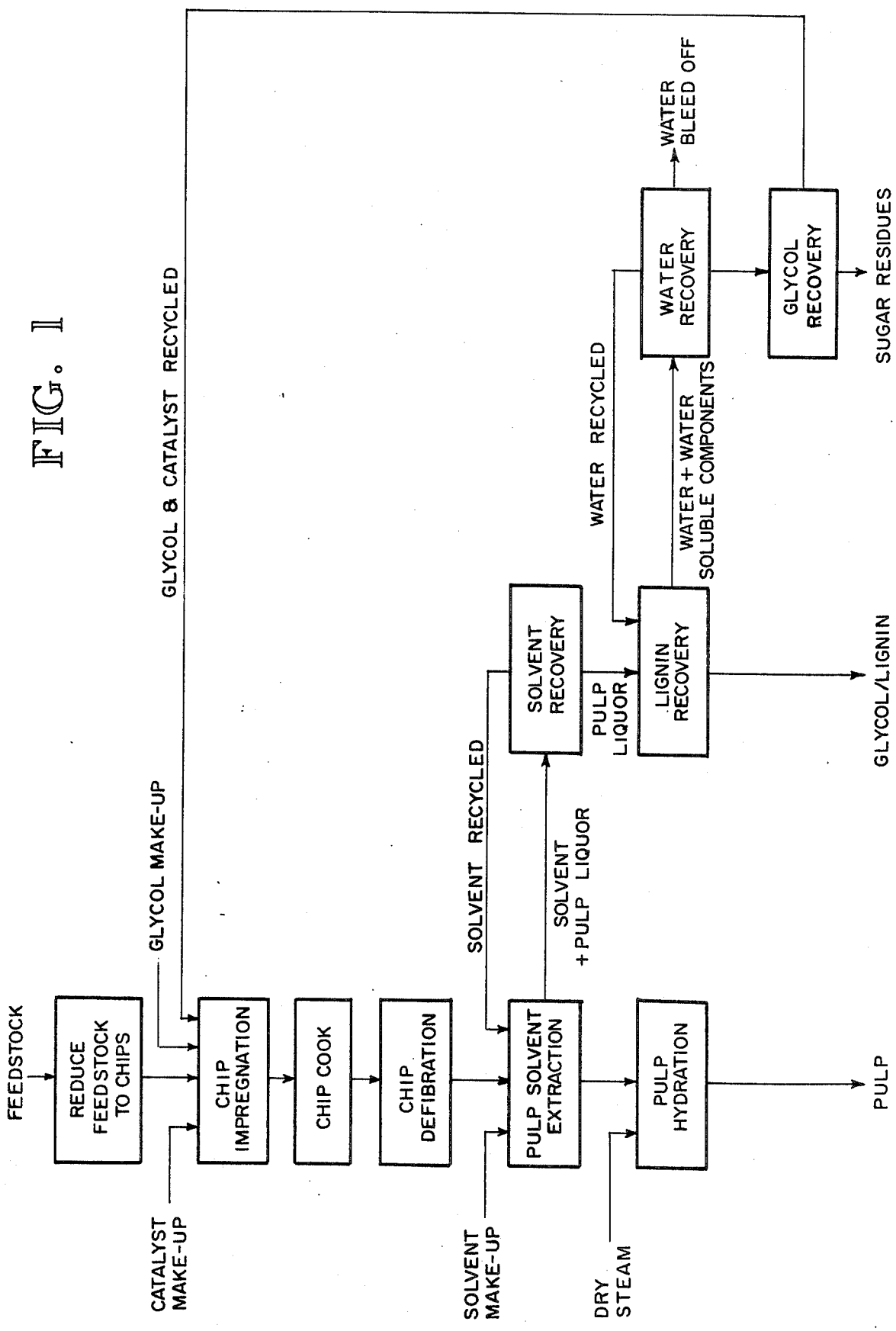
FIG. 1 is a flow schematic of the process claimed.

Wood and/or woody products as used in this specification refer to softwoods, hardwoods and other lignocellulosic materials such as bagasse, straw, etc. The process is particularly useful in treating of coniferous woods, such as Douglas fir, pine, hemlock and spruce. The bulk of the wood found particularly along coastal areas as well as in temperate and sub-temperate lands is coniferous. Mild delignification processes such as the soda process and the Kraft process normally do not remove sufficient lignin to make them economical for ruminant feed. Work carried out at several institutions has led to the conclusion that at least 60 percent of the available lignin must be removed before wood pulp becomes effective as a ruminant feed. This is more true with softwood than hardwood. The phenolic content of the lignin in softwoods and its availability in the softwood has an effect on the microflora in the ruminant, resulting in decreased energy utilization unless the delignification is greater than 60 percent. The curve of digestibility v. percent delignification is quite steep in the area of 60 percent.

"Extraneous components" as used in this specification, has reference to those substances present in wood and/or woody products which could be harmful to the microflora of the ruminant animal.

The wood and/or woody products are comminuted in a hammer mill or other conventional equipment to a size suitable for treating, preferably to an average of ¼ inch minus. The moisture content of the wood is preferably at its normal moisture content, which generally ranges from 6 to 12 percent. In contrast to the process described in U.S. Pat. No. 2,772,968, which uses an anhydrous system, the process described herein is a hydrated system, with water being consumed in the reaction during digestion. In the anhydrous process described by U.S. Pat. No. 2,772,968, the addition product of lignin and triethylene glycol is preferentially formed. Although this patent describes a process for making paper pulp and lignin using triethylene glycol and an acid catalyst, such as anhydrous aluminum chloride, there are discrepancies in the patent which are not substantiated. Some of these are:

1. Anhydrous aluminum chloride is not needed to effect pulping. A completely anhydrous aluminum chloride, anhydrous triethylene glycol and dry wood (<2% $H_2O$) do not delignify and defibrate.
2. Water is necessary to get adequate delinification and is necessary in the hydrolysis of the carbohydrate materials.
3. The patent discloses recycle of the triethylene glycol without distillation. If this is done, a buildup of solubilized carbohydrates in the triethylene glycol solvent would occur to the extent of 10 to 20 percent in the first and second cycles. Such a buildup interferes with the cook cycle.
4. The use of glycol in pulping and the formation of a glycol lignin reaction product is well documented in the literature (see Gray, King, Hibbert and Braun et al., *Canadian Journal of Research* 1930–1936). These compounds are described in Braun, *Chemistry of Lignin*, Vol. I and Vol. II.

After comminution, the wood chips are mixed with and thoroughly impregnated with a glycol-catalyst solvent mixture. The glycols and/or glycol-ethers which may be used in the process for delignification and removal of extraneous components include aliphatic, glycols and/or glycol-ethers containing from 2 to 6 carbon atoms, such as ethylene glycol, diethylene glycol, triethylene glycol, 1,2-propylene glycol or 1,2-dripropylene glycol. Preferred are diethylene glycol and triethylene glycol. These alcohols are solvents for lignin in the materials being treated and, under the treating conditions employed, the lignin-cellulosic bond is broken, releasing the lignin and/or lignin ether. The quantity of glycol used should be sufficient to thoroughly impregnate and wet the material. In the case of triethylene glycol, a ratio of at least 1.7 parts triethylene glycol to 1 part wood or woody product is used. In order to improve the digestion time and to thoroughly impregnate and penetrate the solvent mixture into wood chips, a system of alternating vacuum and pressure is preferred to impregnate the chips. The wood chips may be digested using an excess of the solvent mixture; however, this is not economical.

The catalyst used may be any acidic catalyst which will furnish an increase in the hydrogen ion concentration of the mixture. The amount of catalyst should be sufficient to maintain the pH of the solvent mixture on the acid side to a point at which the wood material being treated becomes delignified. Any of the mineral acids may be used, such as sulfuric, hydrochloric, hydrobromic, phosphoric, and nitric acids. Organic acids may also be used, such as acetic, formic, propionic, oxalic, maleic, citric, or phthalic acids. Acid salts may be used, such as ferric chloride, sodium hydrogen sulfate, mono-ammonium phosphate, ammonium sulfate, aluminum chloride, etc. Boron trifluoride and/or its etherate complex may be used so long as it is thoroughly extracted from the food product which is fed to the animal. Preferred are catalysts which are soluble in the glycol solvent and which are non-toxic to the animal being fed. Aluminum chloride ($AlCl_3.6H_2O$), for these reasons, is preferred as a catalyst and is used in an amount ranging from 1 to 5 percent by weight, as the hydrate $AlCl_3.6H_2O$, based on the weight of the glycol solvent, preferably about 3 percent by weight. None of the above mentioned catalysts are used anhydrous.

Any excess solvent mixture remaining after impregnation of the wood material is drained away and the material conveyed to a vessel for heating. Any type of heating vessel may be used so long as intimate mixing and uniform heat distribution to the impregnated material are obtained. An open kettle provided with a condenser and agitation, or a closed-system rotary digester, may be used. Preferred is a horizontal continuous, closed-system, screw conveyor wherein the impregnated material is conveyed through the horizontal vessel at a predetermined rate. The vessel or horizontal chamber is sized to provide suitable cooking time within the vessel. Cooking is preferably carried out in a inert atmosphere, such as nitrogen. The rate of delignification of the wood material is dependent upon the amount of catalyst used, the temperature and the time of contact. A temperature of at least 145° C, preferably 155° to 170° C, is used to obtain adequate delignification of the wood material and reaction of the glycol solvent mixture with the material to break the lignin-cellulosic bonds. The time of contact of the solvent mixture with the wood material may range from 1 to 5 hours, depending on the amount of delignification desired. The contact time can be reduced if heating is provided by microwave energy rather than by conventional means. During digestion, some of the excess water distills off, along with volatiles, such as terpenes, oleo or oleoresinous materials, and acids, such as acetic or formic acid. These are collected and may be recovered, if desired, by conventional means.

Heat exchange means may be provided at the discharge end of the cooking vessel to transfer heat from the wood material being discharged to the cooking vessel in order to conserve heat energy and improve the heat efficiency of the system.

The wood material discharged from the cooking vessel is then difibrated by conventional means, such as by means of an Asplund or Bauer difibrator. It is important to break up the fiber bundles of the wood material to assure recovery of the glycol cooking solvent and catalyst.

If the wood material is cooked in excess of glycol, the excess glycol solvent may be recovered by filtering the defibrated wood/solvent mixture.

The defibrated wood material is then subjected to an extraction process to extract the glycol solvent and catalyst therefrom as completely as possible. U.S. Pat. No. 2,772,968 describes washing triethylene glycol from wood chips with triethylene glycol. Applicants have found that it is impossible to wash triethylene glycol and lignin from wood chips without first defibrating the chips. The amount of triethylene glycol needed to was the chips as described by the above-mentioned patent would require in the order of 10 to 20 parts triethylene glycol to 1 part pulp. On this basis, a hundred-ton-per-day plant would have to recover 4 million pounds of triethylene glycol from washing of the pulp plus an additional 1.3 million pounds of triethylene glycol used to impregnate the chips for cooking, or a total of over 5 million pounds of triethylene glycol per day, equivalent to about 500,000 gallons. The triethylene glycol would have to be concentrated in order to remove the dissolved lignin therein with a minimum of water. The energy and equipment requirements to evaporate and concentrate the solvent and the amount of solvent which would have to be used render the process described by U.S. Pat. No. 2,772,968 totally impractical and impossible.

The defibrated wood material coming from the cooking vessel is extracted with a lower aliphatic alcohol such as methanol, ethanol, propanol or butanol. Ethanol or an ethanol/water mixture is preferred. One hundred percent ethanol may be used; however, better results have been obtained using an 80/20 ethanol/water mixture. Greater amounts of water result in precipitation of the lignin on the pulp, which is undesirable. The defibrated wood material is slurried in the extraction solvent. Sufficient extraction solution is added to the defibrated chips to make a heavy slurry which is then pumped to a washing system utilizing the extraction solution as the wash liquid. Preferably, the slurry of wood material and extraction solution is subjected to countercurrent extracting using fresh extraction solution for extraction of residual glycol and catalyst remaining in the defibrated wood material. The equipment used for countercurrent extraction is conventional. The glycol cooking solvent appears to adhere to the pulp and cannot be effectively removed without suitable extraction. Extraction of the defibrated pulp with an ethanol/water extraction solution removes the cooking solvent, in the case of triethylene glycol, so that the fiber has about a 0.35 percent residue. Without subjecting the defibrated pulp to such an extraction, 35 percent triethylene glycol can remain in the pulp and would be lost in washing with water, rendering the process uneconomical.

The pulp recovered from solvent extraction is a relatively anhydrous pulp containing substantially no extraneous components, such as alkaloids, etc. and is sufficiently delignified (greater than 70 percent) to make the pulp an excellent food for ruminant animals. Properties of the pulp obtained will be described in greater detail later.

The extraction solvent, after extraction of the pulp, contains the alcohol extractant, water, glycol cooking solvent, solubilized lignin, wood sugars and other solubilized extraneous components. The alcohol extraction solvent from solvent extraction is recovered for reuse by distillation and is recycled for reuse. Distillation is carried out at a temperature sufficient to remove the alcohol extraction solvent without carrying over any of the glycol cooking solvent. The residue from distillation comprises the cooking solvent, solubilized lignin, extraneous components and wood sugars. In the case of ethanol/water as the extraction solution, it distills as an ethanol/water azeotrope.

Lignin is removed from the mixture by precipitation. It has been found that if the distillation residue containing the solubilized lignin is poured hot into water maintained at about 70° C, the lignin precipitates in a form which is both filterable and washable. At a water temperature less than 70° C, the lignin precipitates but is gelatinous and not filterable nor washable.

The filtrate remaining after precipitation of the lignin is subjected to vacuum distillation to remove water, glycol cooking solvent and catalyst for recycle and reuse. The residues left include wood sugars and extraneous components which may be diluted with water to form a syrup, or retained as a solid for storage or further processing.

The pulp obtained by this process is essentially free of any extraneous components and has a lignin content commensurate with the time, temperature and amount of catalyst used during digestion. The anhydrous pulp has an important advantage over other pulps manufactured by the conventional Kraft or sulfite processes. In conventional pulp processes water is used to wash lignin and treating chemicals from the pulp. Complete hydration of the pulp occurs. In order to dehydrate the pulp produced to a dry pulp, expensive evaporation is needed. The pulp obtained by the process described herein is organic solvent extracted and is not hydrated with water. The pulp freeness is entirely different than conventional pulp and is essentially in the anhydrous state and can be injected with nutrients for enzyme attack prior to hydration.

Extensive work has shown that conventional pulp, once completely dry, will not come back to the same nutrient level as pulp that has never been dried. The pulp produced by the process described herein, even though it is recovered in a nearly anhydrous state, retains its nutrient value on hydration.

It is also known that complete hydration of pulp slows down the activity of the cellulase enzyme due to the strong bond associated with the water and cellulose. The injection of nutrients prior to hydration of the pulp improves the digestibility of the pulp, enhances the microflora in the digestion system of the ruminant and gives a more rapid uptake of energy.

Figure 2:
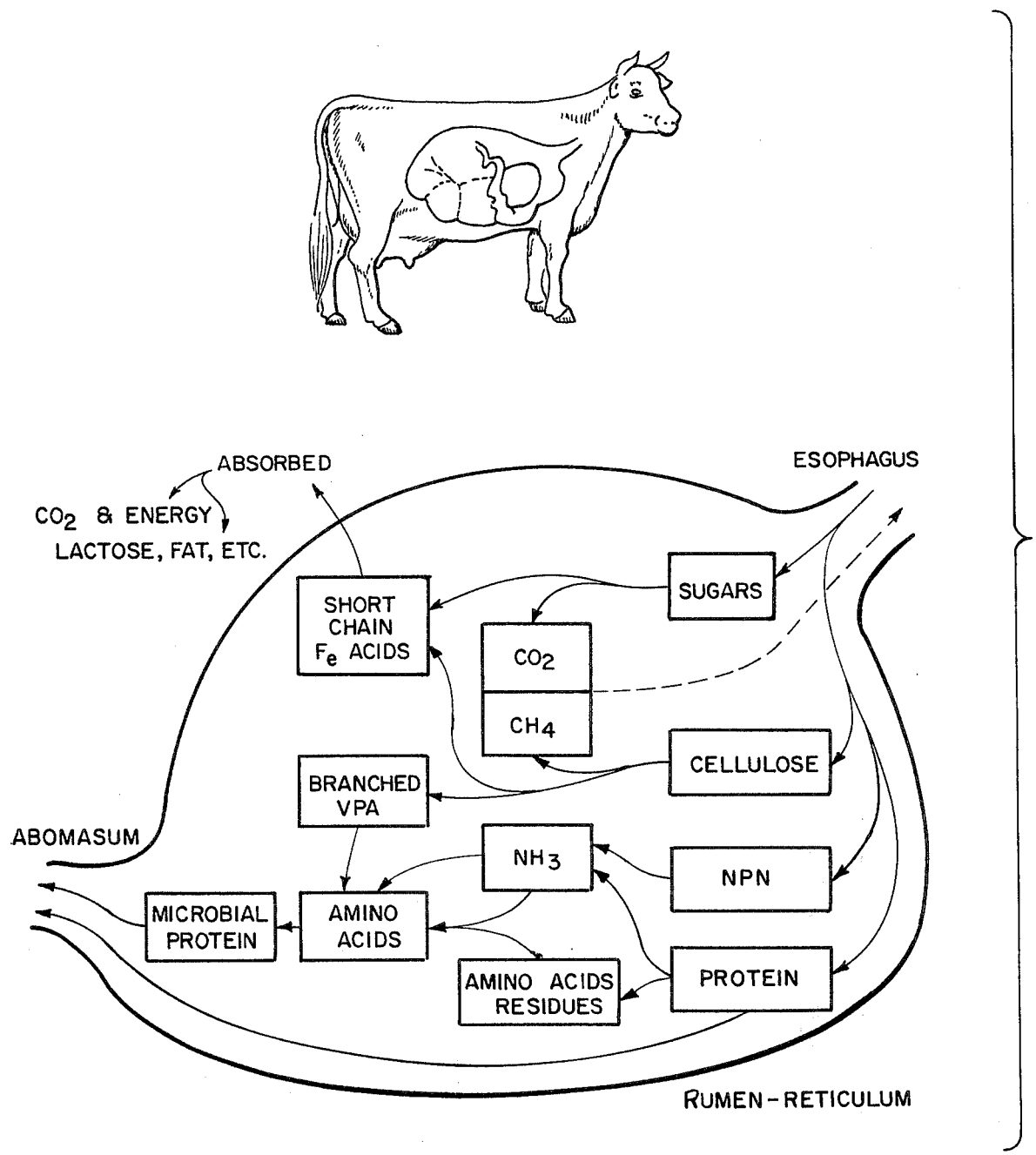
FIG. 2 is a sketch of the digestion system of the cow.

FIG. 2 illustrates reactions which take place in the rumen and reticulum of the ruminant animal to convert cellulose into short-chain fatty acids which are absorbed and used by the cow. Nitrogen-containing materials are also converted into amino acids suitable for use by the cow. Lignin removal by the process described is in the order of 85 to 90 percent. The extraneous components in the wood are extracted, leaving a pulp comparatively free of extraneous components and retaining only bound lignin. The digestibility of the pulp obtained is in the order of 85 to 90 percent of the equivalent of pure cellulose in terms of in vitro feeding studies.

The following examples are intended to be illustrative of the process but are not intended to be limiting.

EXAMPLE I 100.0 grams of hemlock chips (dry weight) were added to a solvent mixture of 1,000 grams triethylene glycol and 3.0 grams of $AlCl_3.6H_2O$. The chips and solvent mixture were charged to a resin kettle provided with a heating mantle and a condenser fitted with a water trap. A stirrer and thermometer were also provided in the kettle. The reaction mass was heated for 5 hours at 155° C. and then cooled. The pulp mixture was then placed in a Waring blender and mixed for 5 minutes, and then filtered through a Buchner funnel. The retained pulp was then extracted successively with a mixture of ethanol/water (80:20 by volume) to remove all traces of lignin-triethylene glycol and extraneous components, including wood sugars, from the pulp. The alcohol/water/TEG/lignin extract was then distilled to remove the ethanol/water. The distillation residue, containing triethylene glycol, lignin, the extraneous wood components and wood sugars, was returned to the filtrate from the pulp and the whole was then subjected to vacuum distillation at 125° C. and 10 microns Hg to recover triethylene glycol and the aluminum chloride catalyst, which distilled over with the triethylene glycol solvent. When the distillation was 75 percent complete, it was stopped and the thick lignin-containing syrup, also containing triethylene glycol, trace amounts of aluminum chloride, exraneous components and wood sugars, was poured into 4 volumes of water under agitation to precipitate the lignin. The mixture containing the lignin precipitate was heated to 70° C., at which temperature the lignin appeared to coalesce and became easily filterable and was recovered as a brown powder. The filtrate water was evaporated and the triethylene glycol, wood sugars and extraneous components concentrated to a syrup. The syrup was then vacuum distilled to remove triethylene glycol and any remaining amounts of aluminum chloride catalyst, which were returned to the system. The residue of wood sugars and extraneous components was diluted with water to make a syrup solution of sugars which may be used as wood molasses for ruminant animal feed provided extraneous components of the wood species being treated are not harmful to the microflora of the ruminant animal. If the residue does contain extraneous components which are detrimental to the ruminant animal, the wood sugar component is further purified.

The pulp obtained from the ethanol/water extraction was then thoroughly hydrated with water to from a pulp mat. The pulp mat, after vacuum filtration, contained in the order of 75 percent water and 25 water solid matter. The pulp product obtained was used in vitro feeding studies conducted at Washington State University to determine the digestibility of the feed material as compared to control materials. The pulp material was found to be 85 to 90 percent the equivalent of pure cellulose as a food material for ruminant animals. The following factors are significant concerning the pulp and its digestibility:

acid detergent fiber: 93.3% by weight;
acid detergent lignin: 7.7% by weight;
ash: 0.01% by weight;
digestibility (in vitro as compared to a control sample): 90%;
solid matter as fed: 23%.

The method of study used for the in vitro studies was the "nylon bag technique" whereby a sample of pulp encased in a nylon mesh bag was inserted into the stomach of a steer through a fistula in the animal. The digestibility was determined in vivo. An alternate method used was the standard in vitro study in which a sample of the rumen fluid was taken from a fistulated steer and mixed with the pulp. The digestion rate of the pulp was determined compared to a control sample. Only a 2% difference was noted in the digestibility of the pulp of Example I determined by both of the in vitro methods.

The economics of the process described are closely tied to losses of the cooking solvent, such as triethylene glycol. Analysis was made on the pulp and the lignin to determine the amount of loss of triethylene glycol solvent and showed the following: pulp — 0.35% triethylene glycol, lignin — 2.15% triethylene glycol. The lignin is known to combine with glycols via the phenolic hydroxyl groups to form an ether linkage which can be broken by acid hydrolysis, if desired.

EXAMPLE II 100 grams of hemlock wood chips were placed in a vacuum pressure vessel and a solvent mixture of 200 grams of triethylene glycol containing 3.0 grams of $AlCl_3.6H_2O$ was poured over the chips. A full vacuum of 28 inches of mercury was applied to the pressure vessel for 10 minutes to thoroughly impregnate the chips, followed by pressurizing the vessel at 100 pounds air pressure for 10 minutes. The impregnated chips were then placed in a constant-temperature oven in a large, covered Petri dish and the oven maintained at 155° C. for 5 hours. After 5 hours, the chips were examined and found to be completely disintegrated to a soft, black fiber, indicating an excessive amount of catalyst was used. It was concluded that the catalyst addition should be based on the amount of triethylene glycol used in the process and not based on the wood.

EXAMPLE III 100 grams of hemlock wood chips and a solvent mixture of 200 grams triethylene glycol and 0.6 grams AlCl$_3$.6H$_2$O were treated as in Example II. The chips were of good color after digestion and were processed in the same manner as in Example I except that the first fitration step was eliminated since there was little excess triethylene glycol solvent after digestion. The chips were directly defibrated and subjected to solvent extraction.

EXAMPLE IV

A cook was made as described in Example I with hemlock chips, reducing the cook time to 1 hour. The lignin pulp extraction showed a yield of pulp yield of 64.8% pulp and 8.1% lignin.

EXAMPLE V

A cook was made as in Example I except that the catalyst was reduced to 1.7 grams AlCl$_3$.6H$_2$O. Less defibration of the fiber occurred during the cook; however, difibration appeared the same after removal from the Waring blender. The yield was 61.8% pulp and 17.1% lignin.

Although other catalysts may be used, such as any mineral catalyst capable of reducing the pH to about pH 3–4, or any acid salt, such as ferric chloride, tin chloride or the like, the preferred catalyst is aluminum chloride hydrate which, if fed to the host animal in small amounts, is not harmful.

Excellent defibration and delignification have been obtained with boron trifluoride etherate and other such complexes. For purposes other than feeding the end product to ruminant animals, these catalyst offer advantages of delignification time and catalyst recovery.

EXAMPLE VI

Wood bark is generally found and is a component of wood chips, and may create a problem as it generally contains extraneous components. For that reason, a cook was made using pure hemlock bark under conditions as described in Example I. The quantity of triethylene glycol used was increased to 15:1 triethylene glycol to hemlock bark to facilitate the additional viscosity obtained and allow the cook to be stirred. In practice, the 2:1 triethylene glycol to wood ratio will be used as that is sufficient to accomplish the etherification of the phenolic hydroxyl groups present in the lignin and sufficient extra to solvate the solubilized lignin for extraction with the alcohol water extractant. The amount of catalyst relative to triethylene glycol used in this cook was 2/3 of that of Example I. This was reflected in a lower lignin yield and a higher pulp yield. Pulp was obtained which was brown in color but which was easily bleached with sodium hypochlorite to a very white, short-fiber pulp sheet.

EXAMPLE VII

Cooks were carried out as in Example I using Douglas fir, pine and cedar, respectively. The yields of these pulps and the lignin are shown in Table I.

| Wood Species | TEG/ Chip Ratio | Cat. (AlCl$_3$.6H$_2$O) | Cook Time | Cook Temp | Pulp Yield g/ 100g Chips | Crude TEG Liq. Yield g/ 100 Chips |
|---|---|---|---|---|---|---|
| Fir | 10:1 | 3.0 | 5 | 155 | 46.6 | 30.9 |
| Pine | 10:1 | 3.0 | 5 | 155 | 48.0 | 30.9 |
| Cedar | 10:1 | 3.0 | 5 | 155 | 40.6 | 37.4 |

The cellulose produced by the process may be hydrated on site or shipped in an anhydrous form. The economics of the process indicate shipping the anhydrous product. One of the peculiarities of the pulp obtained by the process described is that it can be hydrated from its initial anhydrous form without losing nutrient value. This is not true with other pulps.

One of the problems associated with hydrated pulp feeding is the fact that the hydration bond is sufficiently strong enough to inhibit the hydrolysis cleavage by the cellulose enzyme in the digestion system of the ruminant thus slowing down the digestive process and allowing the food to pass through the animal undigested, even though it is theoretically available. The pulp produced according to the process described, by reason of the fact that it is obtained in the anhydrous state at the plant site, can be injected with nutrients which will enhance the cellulose activity after hydration of the pulp takes place due to the available porosity of the anhydrous pulp. This condition does not exist in pulp produced by conventional processes unless the pulp is dried, in which case the nutrient value of the pulp is reduced.

The relation between in vitro digestibility (%) and extent of delignification (%) has been determined (1) for kraft pulps made from paper birch, red oak, red pine and Douglas fir; (2) for wood pulps from paper birch and red pine; and (3) for various pulpmill residues. These are reported in *Cellulose Technology Research*, ed. by Albin F. Furbak, ACS Symposium Series 10, 1974, pp. 75–99. The in vitro rumen digestibility of various pulpmill residues reported in the above article is reproduced below:

TABLE II

| Type of Residue | Lignin | Carbohydrate | Ash | Digestibility |
|---|---|---|---|---|
| | | % | | |
| Groundwood fines | | | | |
| Aspen | 21 | 73 | 1 | 37 |
| Southern pine | 31 | 59 | 1 | 0 |
| Spruce | 31 | 60 | 1 | 0 |
| Screen rejects | | | | |
| Aspen sulfite | 19 | 77 | 2 | 66 |
| Mixed hardwood, sulfite | 24 | 65 | 14 | 54 |
| Mixed hardwood, kraft | 25 | 74 | 9 | 44 |
| Chemical pulp fines | | | | |
| Mixed hardwood, kraft (bleached) | <1 | 109 | 1 | 95 |
| Aspen sulfite (parenchyma cells) | 20 | 73 | 2 | 73 |
| Southern pine, kraft (unbleached) | 28 | 68 | 4 | 46 |

The embodiments of the invention in which a particular property or privilege is claimed are defined as follows:

1. A method of making a food for ruminant animals which is substantially free from substances which are inimical to the microflora contained in the rumen of ruminant animals, comprising:

comminuting wood and/or woody material impregnating the comminuted material with a solvent mixture consisting essentially of an acid catalyst and a glycol or glycol-ether solvent having from 2 to 6 carbon atoms, heating the material impregnated with the solvent mixture to a temperature of at least 145° C. for a time sufficient to delignify the wood at least 70% and solubilize the lignin and wood sugars contained in the material, subjecting the treated material to defibration to form a defibrated cellulose pulp, extracting the solvent mixture from the defibrated pulp with an extraction solvent containing a water-soluble, lower aliphatic alcohol having from 1 to 4 carbon atoms, recovering the solvent extracted pulp substantially in the anhydrous state, and rehydrating the substantially anhydrous pulp for feeding to ruminant animals.

2. The method of claim 1, including:

subjecting the extraction solvent after the extraction step to distillation to recover the extraction solvent, leaving a distillation residue containing the solvent mixture, solubilized lignin, wood sugars and extraneous components, precipitating lignin from the distillation residue, and recovering the solvent mixture from the distillation residue for recycle and reuse.

3. The method of claim 1 wherein the catalyst is hydrated aluminum chloride present in an amount ranging from 1–5% by weight based on the weight of the glycol solvent.

4. The method of claim 1 wherein the weight ratio of glycol solvent to material is at least 1.7:1.

5. The method of claim 1 wherein the extraction solvent is an ethanol/water mixture in a volume ratio of about 80/20.

6. The method of claim 1 wherein the glycol solvent is one selected from the group consisting ethylene glycol, diethylene glycol and triethylene glycol.

7. The method of claim 2 wherein solubilized lignin is precipitated from the distillation residue by mixing the distillation residue with water and heating the mixture to a temperature of about 70° C., the lignin precipitating from the solution in a form which is both filterable and washable.

8. The method of claim 1 wherein extraction of the solvent mixture from the material is by continuous, multistage, countercurrent extraction.

9. A method of making a food for ruminant animals from wood, the food substantially free from extraneous components and having a low lignin content comprising:

comminuting the wood to be treated, impregnating the comminuted wood with a solvent mixture consisting essentially of triethylene glycol and an hydrated aluminum chloride catalyst, the catalyst present in an amount ranging from 1–5% by weight based on the weight of triethylene glycol, the weight ratio of solvent mixture to comminuted wood being at least 1.7:1, heating the wood impregnated with the solvent mixture to a temperature of at least 145° C. for a time ranging from 1 to 5 hours to delignify and solubilize the lignin, wood sugars and other extraneous components in the wood, subjecting the wood to defibration to form a cellulose pulp, extracting the solvent mixture from the pulp with an ethanol-containing extraction solvent, and recovering a substantially anhydrous cellulose pulp.

10. The method of claim 9 wherein the extraction solvent is an ethanol/water mixture in a volume ratio of 80/20.

11. The method of claim 9, including:

subjecting the extraction solvent containing triethylene glycol, catalyst, solubilized lignin, wood sugars and extraneous components to distillation to recover the extraction solvent, leaving a distillation residue containing triethylene glycol, catalyst, solubilized lignin, wood sugars and extraneous components, precipitating lignin from the distillation residue, and recovering triethylene glycol and its catalyst from the distillation residue for recycle and reuse.

12. The method of claim 9 wherein extraction of the triethylene glycol and catalyst from the pulp is by continuous, multi-stage, countercurrent extraction.

13. The method of claim 9 wherein the impregnated wood is heated uniformly in a closed vessel under an inert atmosphere.

14. The method of claim 9 wherein the comminuted wood is impregnated with the triethylene glycol/catalyst mixture by subjecting the wood to vacuum, introducing the triethylene glycol/catalyst mixture, and subjecting the wood/solvent mixture to pressure to uniformly impregnate the wood chips throughout with the solvent mixture.

15. The method of claim 9 including adding to the recovered pulp a nutrient useful to enhance the microflora in the digestion system of the ruminant, and rehydrating the pulp.

16. The method of claim 9 including rehydrating the substantially anhydrous pulp for feeding to ruminant animals.

* * * * *